Dec. 24, 1929.                A. HEYBOER                1,740,649
                              WAFER PLATE
                           Filed Feb. 4, 1929
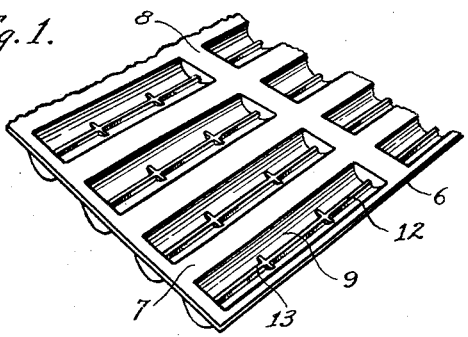
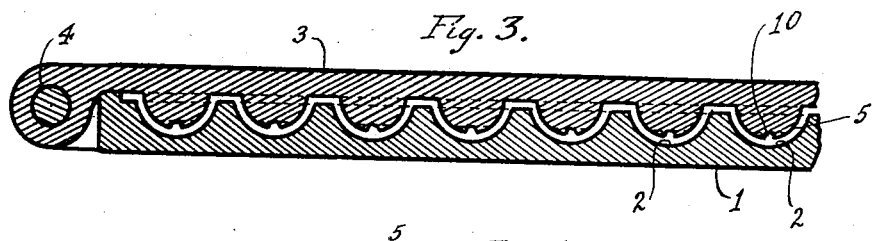
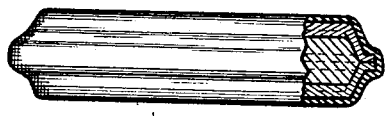
INVENTOR.
Adrian Heyboer,
BY
Rice, Rice & Hann
ATTORNEY.
Witness:

Patented Dec. 24, 1929

1,740,649

UNITED STATES PATENT OFFICE

ADRIAN HEYBOER, OF GRAND RAPIDS, MICHIGAN

WAFER PLATE

Application filed February 4, 1929. Serial No. 337,232.

This invention relates to an improved wafer plate used in the baking of a confection crust.

The main objects of this invention are to provide an improved form of baking plate; to provide a plate to bake a crust which will tend to resist warping and distortion by reason of changes in climatic conditions; to provide a plate to make a crust which may be cut into a plurality of individual units each of which will have a protruding marginal edge at the opposite end thereof; and to provide an improved arrangement of strengthening and supporting ribs in such a product.

An illustrative embodiment of this invention is shown in the accompanying drawings, in which:

Fig. 1 is a fragmentary view in perspective of a portion of a crust baked on my improved plate.

Fig. 2 is a view in elevation of the same with a portion thereof in section to show the longitudinally extending strengthening rib.

Fig. 3 is a view in vertical section of my improved plate used for making this improved crust.

Fig. 4 is a view partly in elevation and partly in section of a completed product made from these crusts.

Fig. 5 is a sectional view taken on the line 5—5 of Fig. 4.

Many attempts have been made to manufacture an edible product in the form of a substantially cylindrical elongated stick having a soft filling material in the interior thereof which is housed within a baked crust, the entire stick being then coated with a suitable confectionery frosting. Trouble has also been experienced on account of warping and distortion of the crusts due partly to moisture in the soft filler and partly to atmospheric and climatic changes to which the product is subjected prior to its sale to the ultimate consumer.

As set forth in my co-pending application executed by me of even date herewith, the trouble hereinabove mentioned can be substantially eliminated by designing the baked crust so that the individual severed portions when assembled are closed at each end by the crust, and when coated with frosting will cause an accumulation of the frosting at the ends of the stick which acts as a seal to hold the crusts together.

Another important feature in making a successful product of this nature however, is in the provision of suitable strengthening ribs which will tend to resist warping and distortion.

In the construction shown in the drawings a suitable baking iron plate has a lower portion 1 provided with a plurality of uniformly spaced elongated semi-cylindrical depressions 2. An upper portion 3 is hinged thereto at 4 and has depending portions 5 which are complementary to the depressions 2 and are adapted to rest therein in spaced relation thereto. Suitable batter is poured upon such a plate suitably heated, and baked in much the same manner as a waffle. The baked sheet 6 as will be seen in Fig. 1 has flat portions 7 and 8 at the sides and ends of the depressions 9. These flat marginal portions 7 and 8 are of sufficient width so that the sheets may be cut between each of the depressions both along the sides and at the ends to form individual stick-like articles and at the same time leave an outwardly projecting marginal edge around each stick.

The depending portions 5 of the upper half of the baking iron has suitable grooves 10 extending longitudinally thereof and also transversely extending grooves 11 so as to form upwardly projecting ribs 12 and 13 respectively in the bottom of each of the depressions 9 of the baked sheet. These strengthening ribs resist warping and bending as hereinbefore mentioned when the product is finally completed and awaiting sale to the ultimate consumer.

In the use of this baked crust, two sheets have the depressions on the face thereof filled with suitable confection and the sheets are then placed face to face with the semicylindrical depressions in one sheet in registry with those of the other. The confection placed in the depression causes the two sheets to adhere together sufficiently so that the sheet may be cut up or severed into a plurality of substantially elongated cylindrical sticks each of which has a crust completely surrounding the filler, both at the sides and at the ends thereof. These sticks are severed so that the flat portions of the crusts 7 and 8 which are between the depressions in the sheet will form laterally extending margins which fit together as shown in Figs. 4 and 5. The individual sticks are then coated with a suitable confection such as chocolate frosting or the like and these laterally projecting margins cause the frosting to accumulate to a considerable thickness around the joint where the two half shells of crust come together. This accumulation of outer coating acts as an effective seal for holding the stick together, which, taken together with the strengthening ribs, satisfactorily resist the tendency to warp and come apart as has heretofore been the case.

Although but one specific embodiment of this invention has been herein shown and described, it will be understood that numerous details of the construction shown may be altered or omitted without departing from the spirit of this invention as defined by the following claims.

I claim:

1. A device of the class described comprising hingedly connected complementary lower and upper plate members, the upper face of the lower member having a middle portion and an upwardly extending flange portion surrounding the middle portion, the middle portion having semi-cylindrical depressions spaced from each other and from the flange portion, and the lower face of the upper plate member having downwardly extending semi-cylindrical ribs nesting in the depressions of the lower plate member in spaced relation therefrom and the middle portions of the plate members being in spaced apart relation in the operative position of the plate members.

2. A device of the class described, comprising a lower plate member having elongated semi-cylindrical depressions therein disposed in spaced relation to one another, a complementary upper plate member adapted to fit face to face with said lower member, a plurality of elongated semi-cylindrical ribs on the face side of said upper plate positioned so as to nest in the depressions of said lower member in spaced relation thereto, said ribs having longitudinally extending grooves therein for the purpose set forth.

3. A device of the class described, comprising a lower plate member having elongated semi-cylindrical depressions therein disposed in spaced relation to one another, a complementary upper plate member adapted to fit face to face with said lower member, a plurality of elongated semi-cylindrical ribs on the face side of said upper plate positioned so as to nest in the depressions of said lower member in spaced relation thereto, said ribs having longitudinally and transversely extending grooves therein for the purpose set forth.

In testimony whereof I have hereunto set my hand at Grand Rapids, Michigan, this 31st day of January, 1929.

ADRIAN HEYBOER.